US007283433B2

(12) United States Patent
Ishihara et al.

(10) Patent No.: US 7,283,433 B2
(45) Date of Patent: Oct. 16, 2007

(54) MANUFACTURING METHOD FOR OPTICAL HEAD DEVICE AND OPTICAL HEAD DEVICE

(75) Inventors: Hisahiro Ishihara, Nagano (JP); Katsuya Moriyama, Nagano (JP); Yasuo Fujimori, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 597 days.

(21) Appl. No.: 10/926,651

(22) Filed: Aug. 25, 2004

(65) Prior Publication Data

US 2005/0083825 A1  Apr. 21, 2005

(30) Foreign Application Priority Data

Aug. 28, 2003 (JP) ............................. 2003-304539

(51) Int. Cl.
*G11B 7/00* (2006.01)
(52) U.S. Cl. .................................................. 369/44.14
(58) Field of Classification Search .............. 369/44.11, 369/44.12, 44.14, 44.15, 112.01, 44.16
See application file for complete search history.

(56) References Cited

U.S. PATENT DOCUMENTS 6,633,530 B1 * 10/2003 Takeda .................. 369/112.01

OTHER PUBLICATIONS

Patent Abstracts of Japan, Publication No. 2000-251268, Publication Date Sep. 14, 2004 (Sharp Corp.) "Grating Adjustment Mechanism of Optical Pickup Apparatus".
Patent Abstracts of Japan, Publication No. 2000-285494, Publication Date Oct. 13, 2000 (Sankyo Seiki Mfg. Co., Ltd.) "Optical Pickup Device".
Patent Abstracts of Japan, Publication No. 2001-052355, Publication Date Feb. 23, 2001 (Victor Co. of Japan Ltd.) "Mthod for adjusting Grating of Optical Pickup".
Patent Abstracts of Japan, Publication No. 2001-056955, Publication Date Feb. 27, 2001 (Sankyo Seiki Mfg. Co., Ltd.) "Optical Pickup Device".

* cited by examiner

*Primary Examiner*—Nabil Hindi
(74) *Attorney, Agent, or Firm*—Reed Smith LLP

(57) ABSTRACT

A manufacturing method for an optical head device includes integrating at least a plurality of light sources and a plurality of diffraction elements with each other as an optical module, adjusting a relative positional relationship of the plurality of diffraction elements each other on the optical module, and then adjusting spot positions of the sub-beams on the optical recording medium by adjusting the entire optical module on the device frame. After that, the optical module is fixed on the device frame.

5 Claims, 7 Drawing Sheets

[Fig.1]
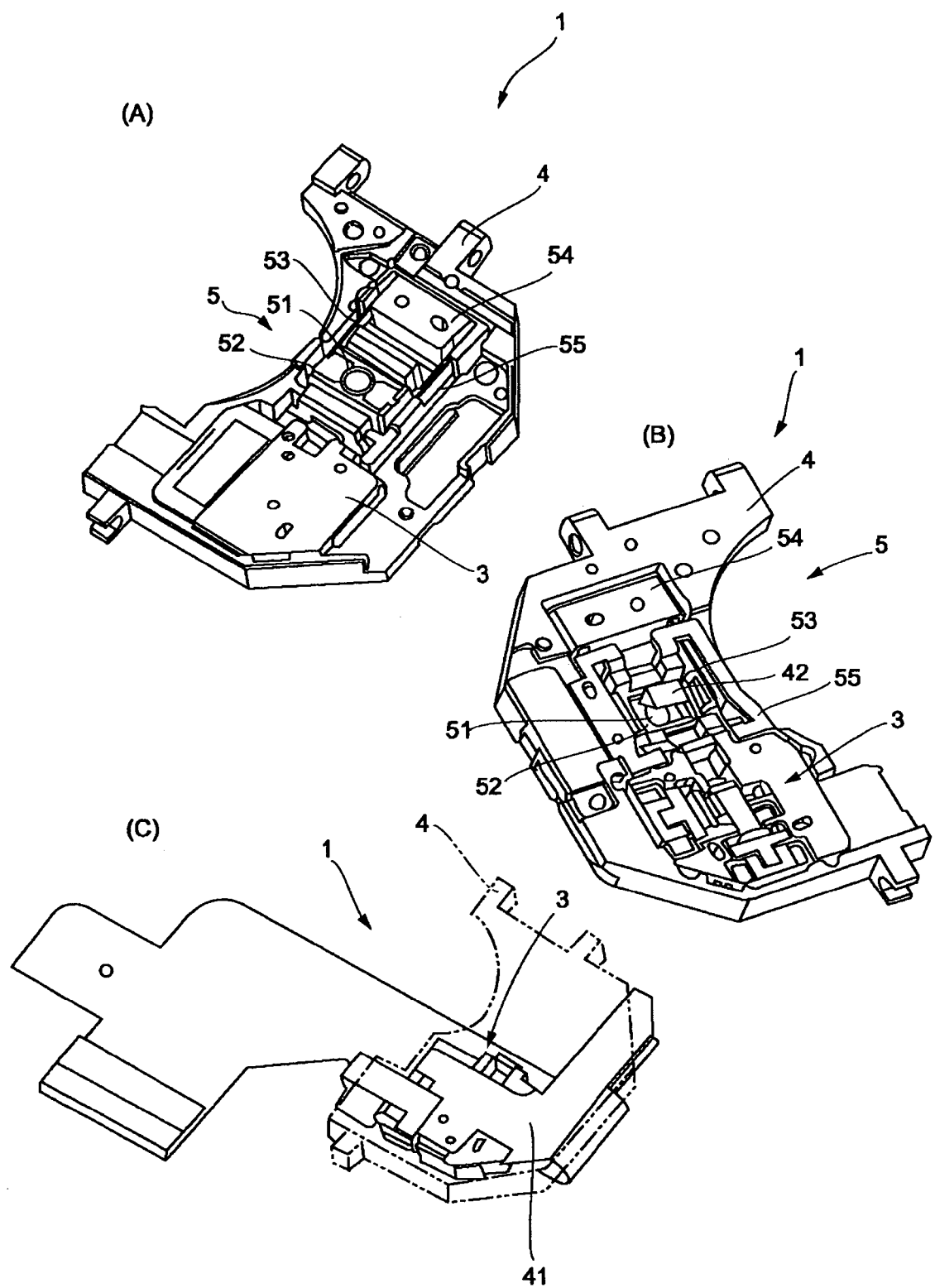

[Fig.2]
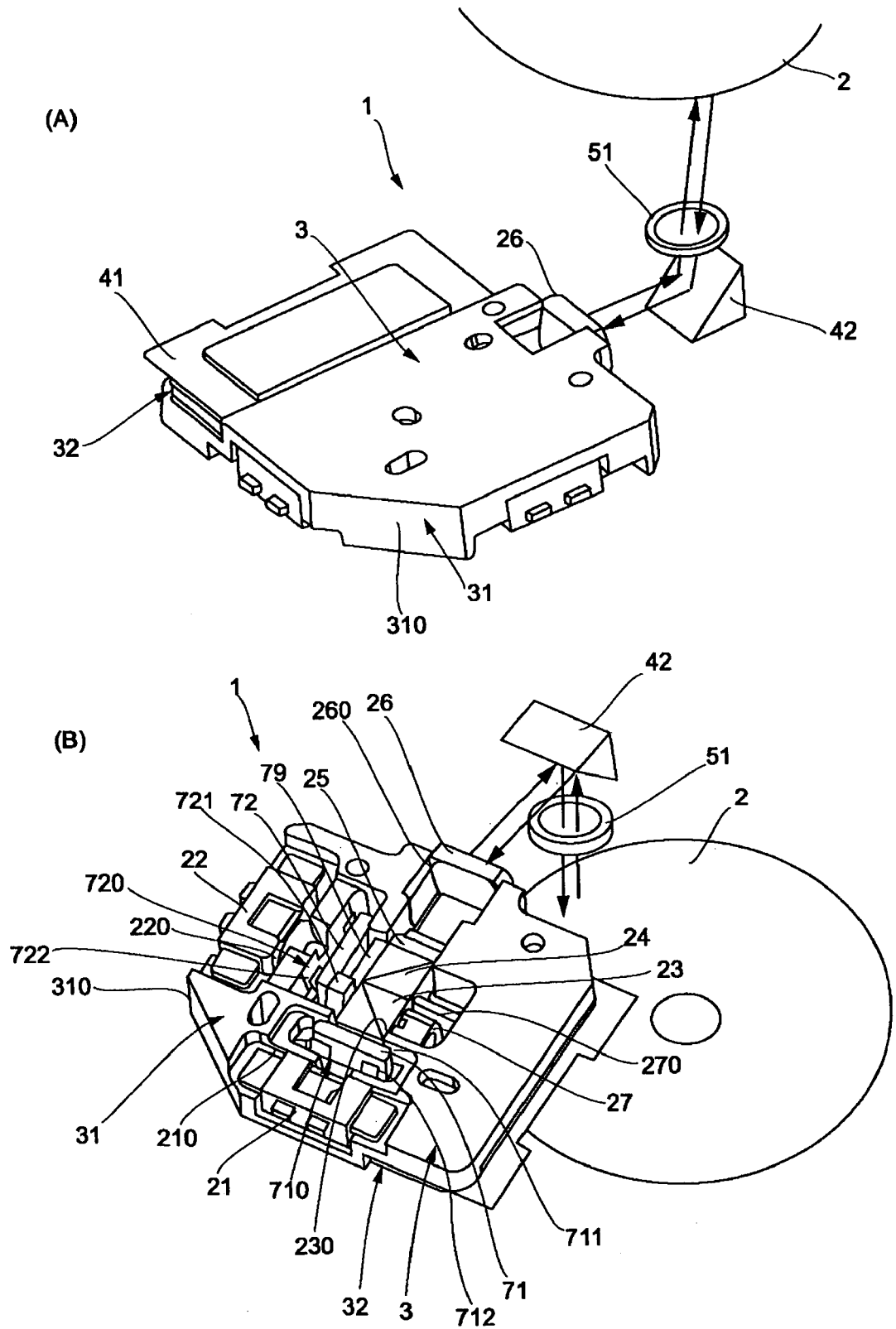

[Fig.3]
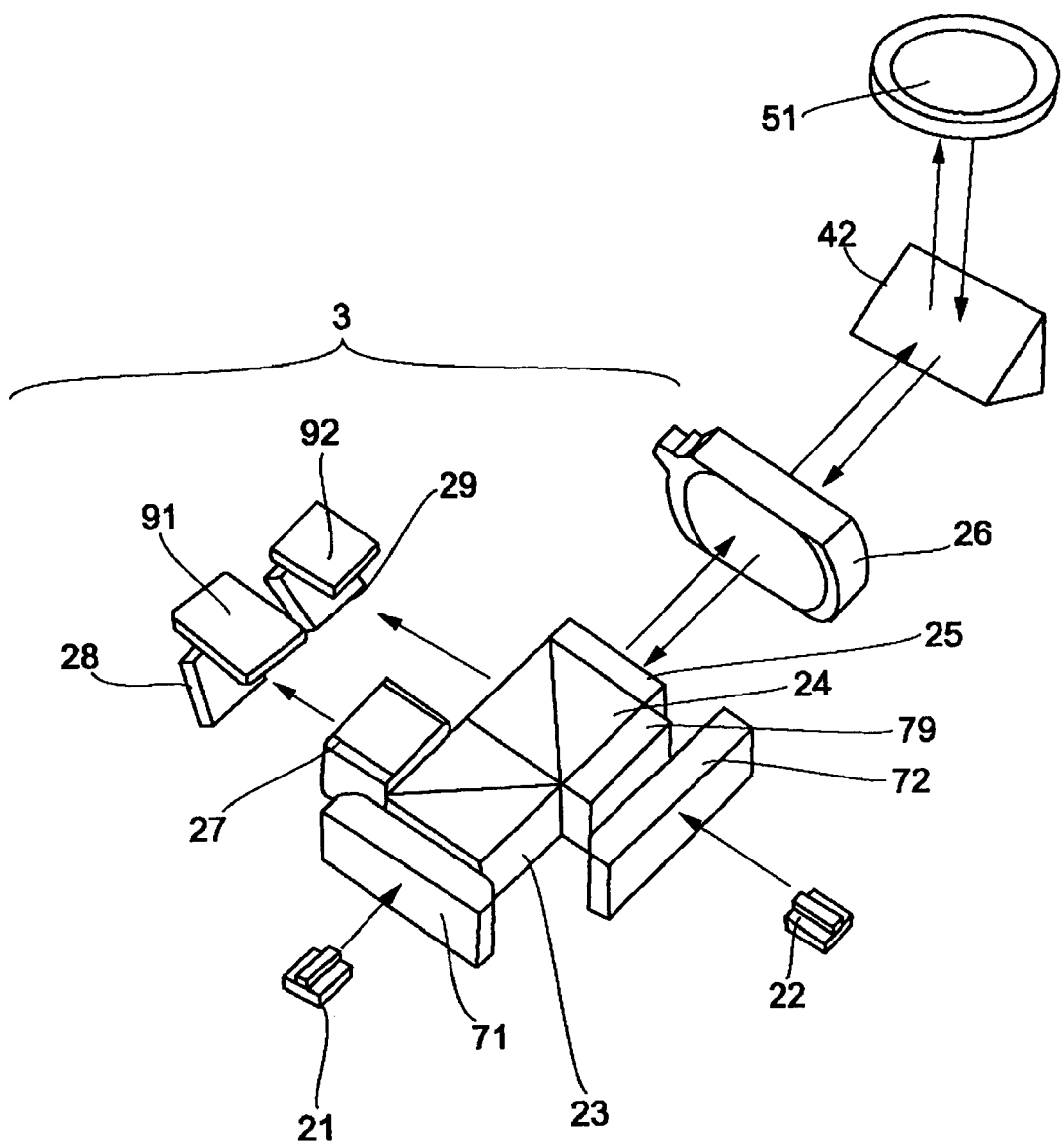

[Fig.4]
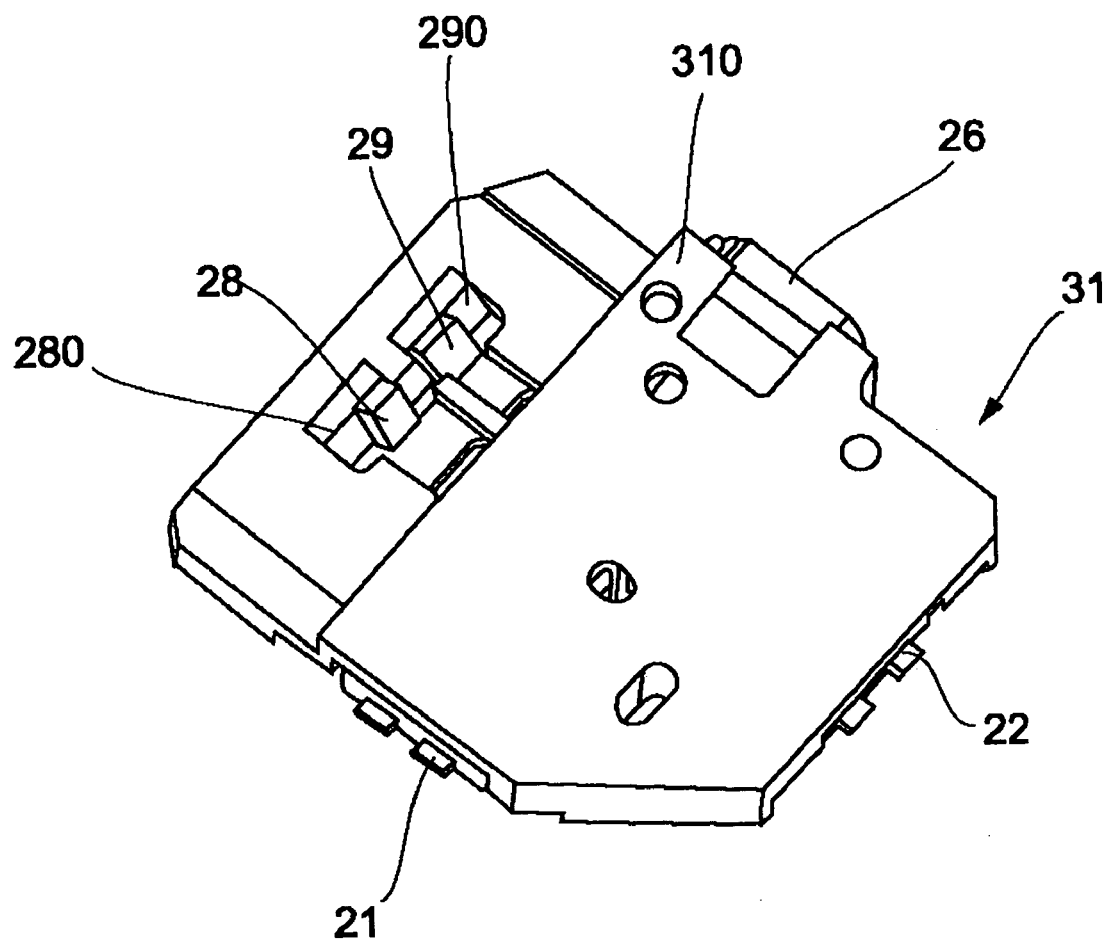

[Fig.5]
(A)
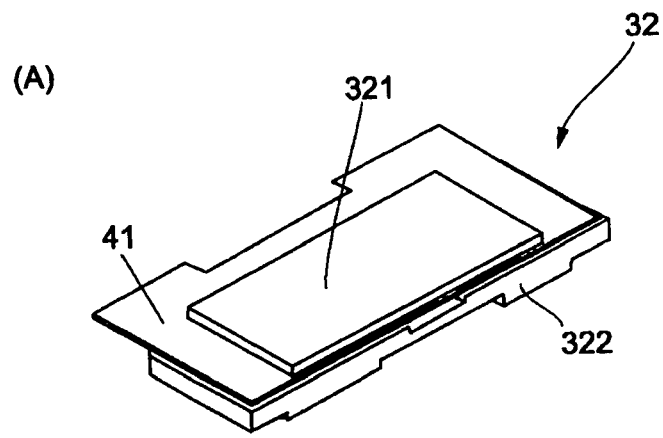
(B)
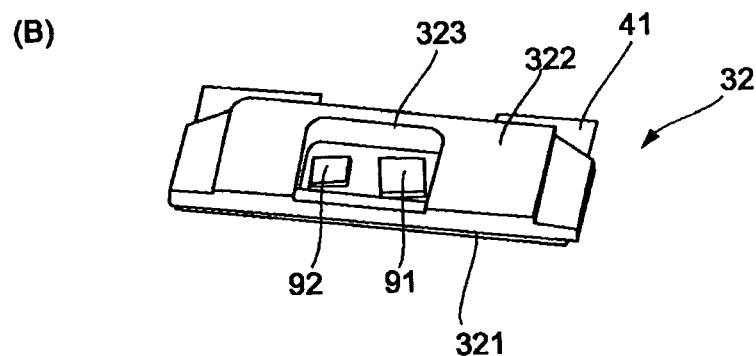
(C)
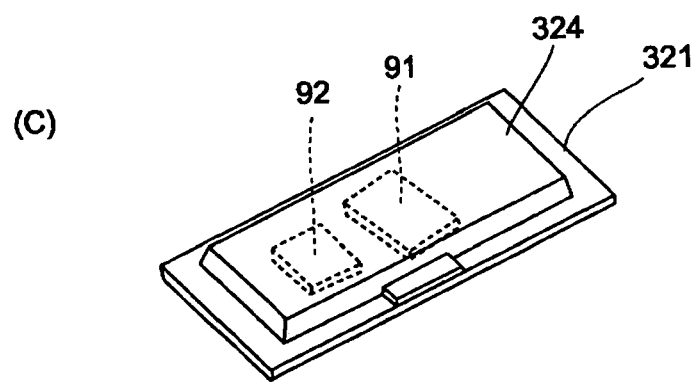

[Fig.6]
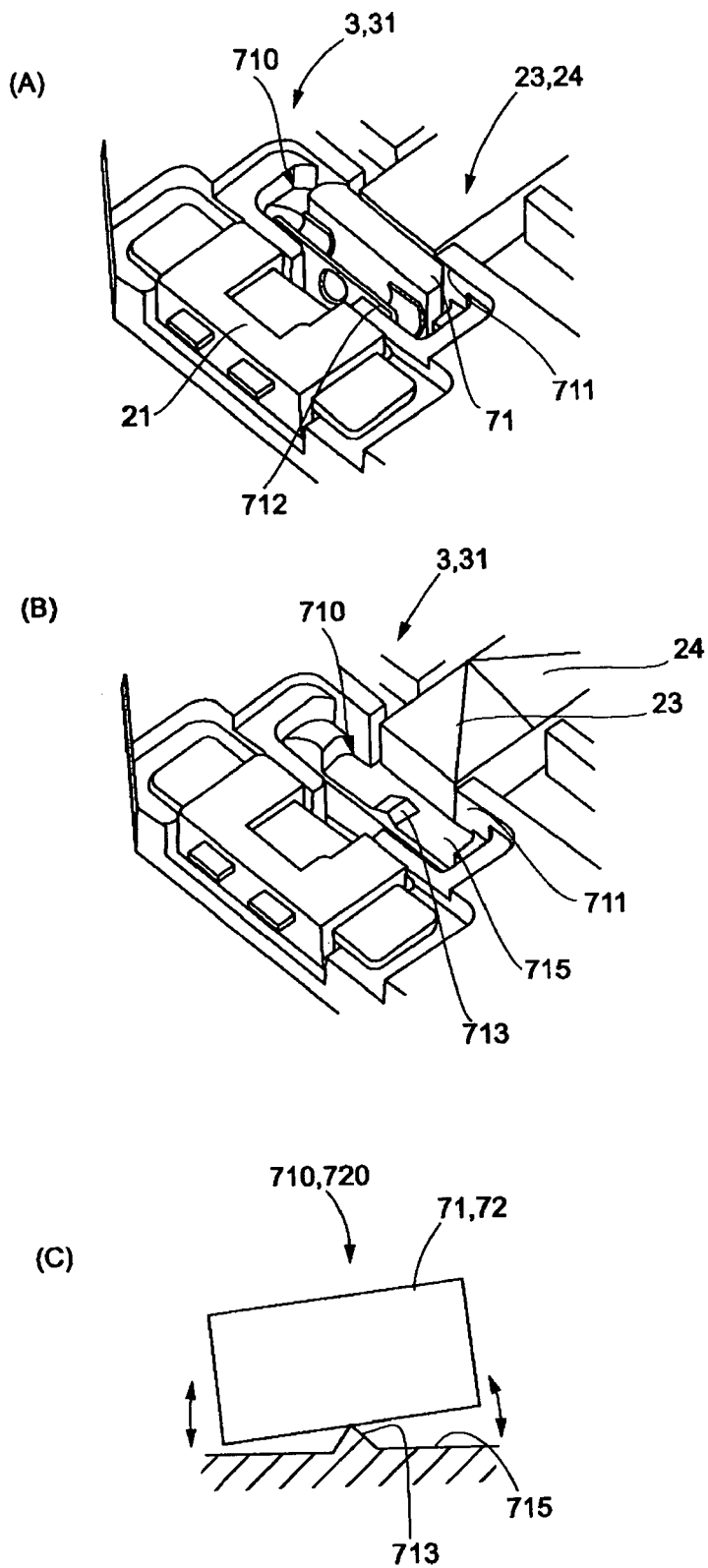

[Fig.7]
(A)
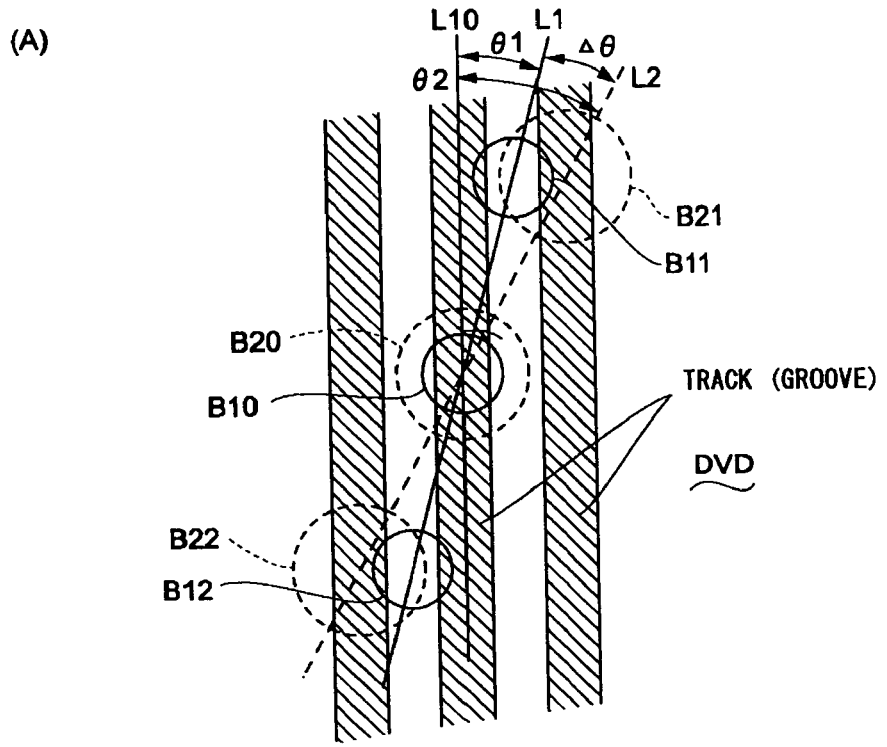
(B)
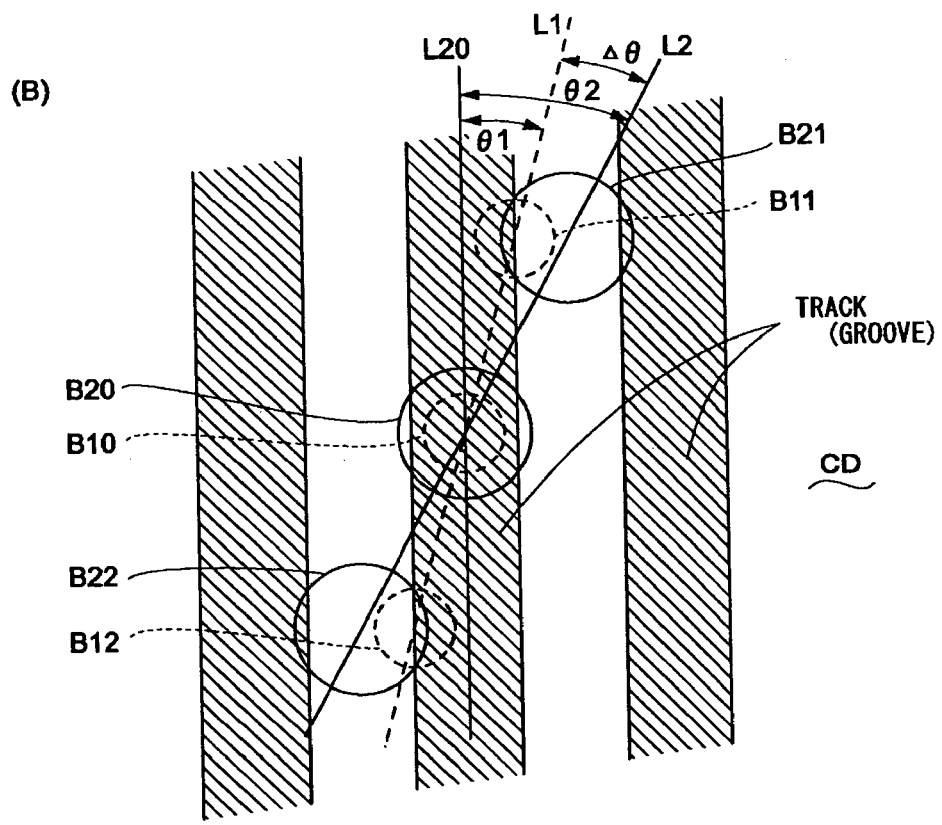

MANUFACTURING METHOD FOR OPTICAL HEAD DEVICE AND OPTICAL HEAD DEVICE

CROSS-REFERENCE TO RELATED APPLICATIONS

This application claims priority to Japanese Application No. 2003-304539 filed Aug. 28, 2003, which is incorporated herein by reference.

BACKGROUND OF THE INVENTION a) Field of the Invention

The present invention relates to a manufacturing method for an optical head device used to reproduce or the like from an optical recording disk such as a CD or a DVD and to an optical head device.

b) Description of the Related Art

In an optical head device, an emitted light beam from a light source is converged by an objective lens on the disk face of an optical recording medium (optical recording disk) and the reflected light beam is received on a light receiving element to perform reproduction of information or the like from an optical recording disk. Also, in the optical head device, a tracking error correction is performed by controlling the operation of the objective lens such that the beam spot of an emitted light beam follows a signal track on a disk surface with a high degree of accuracy.

As a signal detection system for the tracking error correction, a so-called three-beam system (one main beam and two sub-beams positioned on both sides of the main beam) is used to reproduce information from a disk of the CD system. In the three-beam system, a plurality of beams (sub-beam) are generated by a diffraction element and the detection of a tracking error signal is performed by the sub-beams.

On the other hand, for a disk only reading from a DVD system, the detection of a tracking error signal is performed by means of the one beam system in a broad sense which is referred to as the DPD (Differential Phase Detection) method. Also, the detection of a tracking signal is performed by means of the three beam system in a broad sense, which is referred to as the DPP (Differential Push Pull) method for a recordable type disk such as a DVD-R (DVD-Recordable) and DVD-RW (DVD-ReWritable).

In order to detect the tracking error signal by the three beam system, it is necessary to adjust the angular position (phase adjustment) of a diffraction element about the optical axis such that the line connecting the spot positions of the sub-beams on the optical recording disk forms a prescribed angle with the track tangential direction to adjust the spot positions of the sub-beams on the optical recording medium.

The two-wavelength optical head device in which reproducing and recording information is possible for a disk of both a DVD system and a CD system requires a first light source which emits a first laser light beam for reproducing and recording information on a disk of the DVD system and a second light source which emits a second laser light beam for reproducing and recording information on a disk of the CD system. Further, for the detection of a tracking signal by the three beam system for both disks of the DVD system and the CD system, a first diffraction element corresponding to the disk of the DVD system and a second diffraction element corresponding to the disk of the CD system are required as a diffraction element for the tracking error detection because the wavelengths of the laser beams, the track pitches of the disks and the like to be used for reproducing and recording are different.

Accordingly, in the final step of its manufacturing processes for the two-wavelength optical head device, the first laser light source and the second laser light source on a device frame are respectively turned on and a return light beam from an optical recording disk is received with a light receiving element and the angular positions of the first diffraction element and the second diffraction element about the optical axis are adjusted while monitoring the output signal. (see, for example, Japanese Patent Laid-Open No. 2000-251268, Japanese Patent Laid-Open No. 2001-52355, Japanese Patent Laid-Open No. 2000-285494, and Japanese Patent Laid-Open No. 2001-56955).

However, when the size of the optical head device is reduced, the space for mounting the diffraction element also becomes small. Therefore, in the final step of manufacturing processes for the two-wavelength optical head device, a considerable time and labor is imposed that the angular positions of the two diffraction elements about the optical axis are adjusted on the device frame while the respective light sources are turned on and the light receiving result of the return light beam from the optical recording disk is monitored.

Further, when the downsizing and assembling of the optical head device is improved by utilizing an optical module in which optical components such as a light source, a light receiving element and a diffraction element are modularized in a package, considerable time and substantial labor is imposed to respectively adjust the angular positions about the optical axis of the two diffraction elements, which are mounted in close proximity in a small space within the package, in the state that the optical module is mounted on the device frame while the respective light sources are turned on and the light receiving result of the return light beam from the optical recording disk is monitored.

SUMMARY OF THE INVENTION

In view of the problems described above, it is a primary object and advantage of the present invention to provide a manufacturing method for an optical head device and an optical head device, which are capable of easily adjusting the spot positions of the sub-beams generated by a diffraction element on an optical recording medium even when the optical head device is made in a small size.

In order to achieve the above object and advantage, according to an embodiment of the present invention, there is provided a manufacturing method for an optical head device including a plurality of light sources emitting light beams with different wavelengths, a plurality of diffraction elements generating a main beam and sub-beams from the respective light beams emitted from the plurality of light sources, a common light receiving element receiving a reflected light beam from an optical recording medium, and a device frame on which the plurality of light sources, the plurality of diffraction elements, the light receiving element and an objective lens drive mechanism are mounted. The manufacturing method includes integrating at least the plurality of light sources and the plurality of diffraction elements with each other as an optical module, adjusting a relative positional relationship of the plurality of diffraction elements each other on the optical module, then, adjusting spot positions of the sub-beams on the optical recording medium by adjusting the entire optical module on the device frame, and after that, fixing the optical module on the device frame.

In accordance with an embodiment of the present invention, the adjustment of the relative positional relationship of the plurality of diffraction elements is performed by observing the images of the diffracted sub-beams generated by the plurality of diffraction elements on the optical module.

In accordance with an embodiment of the present invention, the adjustment of the relative positional relationship of the plurality of diffraction elements may be performed by observing grating patterns formed on the plurality of diffraction elements.

Further, in order to achieve the above object and advantage, according to an embodiment of the present invention, there is provided an optical head device including a plurality of light sources emitting light beams with different wavelengths, a plurality of diffraction elements generating a main beam and sub-beams from the respective light beams emitted from the plurality of light sources, a common light receiving element receiving a reflected light beam from an optical recording medium, and a device frame on which the plurality of light sources, the plurality of diffraction elements, the light receiving element and an objective lens drive mechanism are mounted. In the optical head device, at least the plurality of light sources and the plurality of diffraction elements are mounted on the device frame in a state that the plurality of light sources and the plurality of diffraction elements are integrated with each other as an optical module, and at least one of respective mounting parts of the optical module for the plurality of diffraction elements is provided with a positioning part for the diffraction element in a direction of an optical axis, a spring member urging the diffraction element against the positioning part for temporary fixing the diffraction element, and a projection serving as a supporting point when the diffraction element is swung about the optical axis or an axial line parallel to the optical axis.

According to the embodiment of the present invention, the diffraction element is urged against the positioning part by the spring member to be temporarily fixed. Therefore, in this state, since the diffraction element can be swung about the optical axis or the axial line parallel to the optical axis with the projection as the supporting point, the angular position of the diffraction element about the optical axis can be easily adjusted.

According to the embodiment of the present invention described above, the plurality of the light sources and the plurality of diffraction elements are integrated with each other as the optical module and, after the relative positional relationship of the plurality of diffraction elements is adjusted on the optical module, the entire optical module is adjusted on the device frame. In other words, it is necessary to adjust the angle formed by the sub-beams with respect to the track tangential direction of the optical recording medium by means of adjusting the respective positions of the plurality of the diffraction elements, and the track pitches are determined when the types of the optical recording media to be used are determined. As a result, since the relative positional relationship of the diffraction elements each other is also determined, the relative positional relationship of the diffraction elements is adjusted on the optical module. Consequently, according to the embodiment of the present invention, fine positional adjustments of the small diffraction elements are not required after the optical module is mounted on the device frame. Therefore, the position adjusting operations for the main beam and the sub-beams with respect to the track can be easily performed.

Further, according to the embodiment of the present invention described above, the positioning part of the diffraction element in the direction of the optical axis and the projection serving as the supporting point when the diffraction element is swung about the optical axis or the axial line parallel to the optical axis are formed to the respective mounting parts of the plurality of diffraction elements in the optical module. Therefore, the relative positional relationship of the plurality of diffraction elements each other can be easily adjusted on the optical module.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

In the drawings:

FIG. 1(A) is a perspective view showing an optical head device to which the present invention is applied viewed obliquely from above, FIG. 1(B) is its perspective view obliquely from below, and FIG. 1(C) is a perspective view showing a state that a flexible circuit board for power feeding is connected to an optical module used in the optical head device viewed obliquely from above;

FIG. 2(A) is a perspective view showing the optical module, a prism and an objective lens which construct an optical system in the optical head device in FIG. 1 viewed obliquely from above, and FIG. 2(B) is its perspective view viewed obliquely from below;

FIG. 3 is an explanatory perspective view showing the optical system in the optical head device shown in FIG. 1;

FIG. 4 is a perspective view showing a state that a second package is removed from a first package in the optical module used in the optical head device shown in FIG. 1;

FIG. 5(A) is a perspective view showing the second package of the optical module used in the optical head device shown in FIG. 1 viewed obliquely from above, FIG. 5(B) is a perspective view showing the second package viewed obliquely from below, and FIG. 5(C) is a perspective view showing a state that a metal plate is removed from the second package viewed obliquely from below;

FIG. 6(A) is a perspective view showing a mounting structure of a diffraction element in the optical module in the embodiment of the present invention, FIG. 6(B) is a perspective view showing a state in which the diffraction element is removed from the mounting portion of the diffraction element, and FIG. 6(C) is an explanatory view showing a position adjusting method for the diffraction element; and FIG. 7(A) is an explanatory view schematically showing the positional relationship of three beams generated by a first diffraction element and the truck of a disk of DVD system, and FIG. 7(B) is an explanatory view schematically showing the positional relationship of three beams generated by a second diffraction element and the truck of a disk of CD system.

DETAILED DESCRIPTION OF THE PREFERRED EMBODIMENTS

An embodiment of an optical head device to which the present invention is applied and a manufacturing method for the optical head device will be described below with reference to the accompanying drawings.

FIG. 1(A) is a perspective view showing an optical head device to which the present invention is applied viewed obliquely from above, FIG. 1(B) is its perspective view obliquely from below, and FIG. 1(C) is a perspective view showing a state that a flexible circuit board for power feeding is connected to an optical module used in the optical head device viewed obliquely from above. FIG. 2(A) is a perspective view showing the optical module, a prism and an objective lens which construct an optical system in the optical head device in FIG. 1 viewed obliquely from above, and FIG. 2(B) is its perspective view viewed obliquely from below. The flexible circuit board is not shown in FIGS. 1(A) and 1(B).

An optical head device 1 shown in FIGS. 1 and 2 is a two-wavelength optical head device which uses a laser beam with the wavelength of 650 nm and a laser beam with the wavelength of 780 nm in order to perform information recording and reproduction to disks of DVD system and CD system as an optical recording medium 2 (optical recording disk).

In the optical head device 1 of the present embodiment which will be described below in detail, a light emitting element such as a laser diode, a light receiving element such as a photodiode, and other optical elements are integrated as an optical module 3. The optical module 3 is, as shown in FIG. 1(C), mounted on a device frame 4 made of metal or resin in a state that a flexible circuit board 41 is attached on the upper face of the optical module 3. Further, on the device frame 4 are mounted a raising prism 42 for reflecting an emitted light beam from the optical module 3 toward an optical recording medium and an objective lens drive mechanism 5 for driving an objective lens 51 which converges a laser beam reflected by the raising prism 42 on the optical recording disk.

As shown in FIGS. 1(A) and 1(B), the objective lens drive mechanism 5 includes a lens holder 52 which holds the objective lens 51 at a center portion on its upper face, a holder support member 54 which movably supports the lens holder 52 in a tracking direction and in a focusing direction with a plurality of wires 53, and a yoke 55 which is fixed on the device frame 4. Further, the objective lens drive mechanism 5 includes a magnetic drive circuit which is comprised of drive coils mounted on the lens holder 52 and drive magnets attached on the yoke 55. The objective lens 51 held on the lens holder 52 is driven in the tracking and focusing direction with respect to the optical recording disk 2 by controlling power supply to the drive coils.

FIG. 3 is an explanatory perspective view showing the optical system in the optical head device shown in FIG. 1.

As shown in FIG. 2(B) and FIG. 3, the optical module 3 includes a first light emitting element 21 for a DVD emitting a first laser beam with the wavelength of 650 nm and a second light emitting element 22 for a CD emitting a second laser beam with the wavelength of 780 nm. The first and second light emitting elements 21 and 22 are constructed such that a diode chip is mounted on a metal lead frame through a sub-mount substrate and surrounded by a resin wall portion for protection.

The optical module 3 is constructed such that the first laser beam emitted from the first light emitting element 21 and the second laser beam emitted from the second light emitting element 22 are guided to a common light path toward the optical recording disk 2 by a prism 24 which is an optical element for synthesizing optical paths. A $\lambda/4$ plate 25 and a collimator lens 26 are disposed in this order on the common optical path. In the optical head device 1, a raising prism 42 mounted on the device frame 4 and the objective lens 51 are disposed between the collimator lens 26 on the common optical path and the optical recording disk 2.

In the optical head device 1 of the present embodiment, a first diffraction element 71 is disposed between the first light emitting element 21 and the prism 23, and a second diffraction element 72 and a $\lambda/2$ plate 79 are disposed between the second light emitting element 22 and the prism 24 in the optical module 3. The first diffraction element 71 generates three beams for tracking error detection from the first laser beam and the second diffraction element 72 generates three beams for tracking error detection from the second laser beam.

Each of the first and the second diffraction elements 71 and 72 is constructed such that a grating face is formed by a dielectric film on a glass substrate and formed in a flat plate shape.

On the opposite side to the second light emitting element 22 with respect to the prism 23 are disposed a sensor lens 27 as an astigmatism generating element, a total reflection mirror 28 for signal detection to reflect the return light emitted from the sensor lens 27, and a light receiving element 91 for signal detection to receive the light beam guided by the total reflection mirror 28 for signal detection. The sensor lens 27 is a lens for generating the astigmatism with respect to the return light of the laser beam. In addition, on the opposite side of the second light emitting element 22 with respect to the prism 24 are disposed a total reflection mirror 29 for monitor to which a part of the light beam is guided, which is emitted from the first light emitting element 21 and the second light emitting element 22 toward the prisms 23, 24, and a light receiving element 92 for monitor receiving the light beam guided by the total reflection mirror 29 for monitor.

In the optical head device 1 constructed as described above, the first laser beam emitted from the first light emitting element 21 partly transmits through partial reflection faces of the prisms 23, 24 and is emitted toward the objective lens 51 through the collimator lens 26. Further, the second laser beam emitted from the second light emitting element 22 is partly reflected by the partial reflection face of the prism 24 and the optical axis of the second laser beam is bent at 90 degrees to be emitted toward the objective lens 51 through the collimating lens 26.

In this case, a part of the first laser beam emitted from the first light emitting element 21 and a part of the second laser beam emitted from the second light emitting element 22 are guided to the light receiving element 92 for monitor as a monitor light through the prism 24 and the total reflection mirror 29 for monitor. The monitored result with the light receiving element 92 for monitor is fed back to the first light emitting element 21 or the second light emitting element 22 to control the intensity of the laser beam emitted from the light emitting element.

The return light from the optical recording disk 2 returns the objective lens 51 and the raising prism 42 in the reverse direction and is emitted toward the sensor lens 27 through the collimator lens 26 and the prisms 24, 23. After the astigmatism is given to the return light by the sensor lens 27, the return light is guided to the light receiving element 91 for signal detection by the total reflection mirror 28 for signal detection to be detected with the light receiving element 91 for signal detection.

The return light detected with the light receiving element 91 for signal detection includes three beams which are generated by means of that the first laser beam emitted from the first light emitting element 21 is diffracted with the first diffraction element 71, and three beams which are generated by means of that the second laser beam emitted from the second light emitting element 22 is diffracted with the second diffraction element 72. The reproduction of a signal is performed by the main beam comprising the zero-order light of the three beams and the detection of a tracking error signal of the objective lens 51 is performed by the sub-beams comprising the ±1st-order diffracted lights.

FIG. 4 is a perspective view showing a state that a second package is removed from a first package in the optical module used in the optical head device shown in FIG. 1. FIG. 5(A) is a perspective view showing the second package of the optical module used in the optical head device shown in FIG. 1 viewed obliquely from above, FIG. 5(B) is a perspective view showing the second package viewed obliquely from below, and FIG. 5(C) is a perspective view showing a state that a metal plate is removed from the second package viewed obliquely from below.

In the embodiment of the present invention, in order to construct the optical head device 1, the raising prism 42, the objective lens 51, and the objective lens drive mechanism 5 are directly mounted on the device frame 4. However, the first light emitting element 21, the second light emitting element 22, the prisms 23, 24, the λ/4 plate 25, the λ/2 plate 79, the collimator lens 26, the sensor lens 27, the total reflection mirror 28 for signal detection, the total reflection mirror 29 for monitor, the first diffraction element 71, the second diffraction element 72, the light receiving element 91 for signal detection and the light receiving element 92 for monitor are integrated with each other as the optical module 3 shown in FIG. 2 and mounted on the device frame 4.

As shown in FIGS. 2(A) and 2(B), the optical module 3 is constructed such that the first package 31 and the second package 32 are joined overlapped. The light receiving element 91 for signal and the light receiving element 92 for monitor are adjacently disposed in the second package 32, and other optical components are disposed in the first package 31.

As shown in FIG. 2(B), on the under face side of the frame 310 of the first package 31 are mounted in an exposed state the first light emitting element 21, the second light emitting element 22, the prisms 23, 24, the λ/4 plate 25, the λ/2 plate 79, the collimator lens 26, the sensor lens 27, the first diffraction element 71, and the second diffraction element 72.

Further, as shown in FIG. 4, the total reflection mirror 28 for signal detection and the total reflection mirror 29 for monitor are adjacently mounted on the upper face side of the frame 310 of the first package 31 on the portion on which the second package 32 is covered.

As shown in FIGS. 5(A) and 5(B), the second package 32 is constructed such that the wiring board 321 and the metal plate 322 are overlapped from both sides so as to sandwich the flexible circuit board 4. The wiring board 321 is provided with a mounting face of the light receiving element 91 for signal detection and the light receiving element 92 for monitor on the metal plate 322 side, and the metal plate 322 is formed with an aperture part 323 which exposes the light receiving element 91 for signal detection and the light receiving element 92 for monitor. In addition, as shown in FIG. 5(C), the light receiving element 91 for signal detection and the light receiving element 92 for monitor are covered with transparent resin 324 in the state mounted on the wiring board 321 and thus isolated from the metal plate 322 even when the wiring board 321 is overlapped on the metal plate 322.

FIG. 6(A) is a perspective view showing the mounting structure of the diffraction element in the optical module used in the optical head device shown in FIG. 1, FIG. 6(B) is a perspective view showing a state in which the diffraction element is removed from the mounting portion of the diffraction element, and FIG. 6(C) is an explanatory view showing a position adjusting method for the diffraction element.

As shown in FIGS. 6(A) and 6(B), a first diffraction element mounting part 710 comprising a recessed part formed in a groove shape is formed in the first package 31 of the optical module 3 in the embodiment of the present invention. A positioning face 711 which abuts with the front face of the first diffraction element 71 is formed in the first diffraction element mounting part 710. The front face of the first diffraction element 71 abuts with the positioning face 711 and is fixed with adhesive in a state that the first diffraction element 71 is positioned in the optical axis direction. Further, a leaf spring 712 is disposed on the back face side of the first diffraction element 71 in the first diffraction element mounting part 710. The leaf spring 712 is used to temporarily fix the first diffraction element 71 by urging the front face of the first diffraction element 71 against the positioning face 711 until the first diffraction element 71 is adhesively fixed. Moreover, a projection 713 is formed on the bottom part 715 of the first diffraction element mount part 710 as shown in FIG. 6(C). The projection 713 is used to be a supporting point for swinging the first diffraction element 71 in the circumferential direction about the optical axis or the axial line parallel to the optical axis when the angular position of the first diffraction element 71 is adjusted in the circumferential direction about the optical axis before the first diffraction element 71 is adhesively fixed.

As shown in FIG. 2(B), in the first package 31 are provided a second diffraction element mounting part 720 comprising a recessed part in a grooved shape for the second diffraction element 72, a positioning face 721 with which the front face of the second diffraction element 72 abuts, a leaf spring 722 for temporary fixing, and a projection 723 serving as a supporting point (see FIG. 6(C)). The construction is similar to that for the first diffraction element 71 and the description has been described.

FIG. 7(A) is an explanatory view schematically showing the positional relationship between three beams generated by the first diffraction element and the truck of a DVD, and FIG. 7(B) is an explanatory view schematically showing the positional relationship between three beams generated by the second diffraction element and the truck of a CD.

In order to manufacture the optical head device 1 in accordance with the embodiment of the present invention, as shown in FIG. 2(B), after the respective optical components are mounted on the first package 31 and the second package 32, both the packages 31 and 32 are joined together to manufacture the optical module 3.

First, the first package 31 and the second package 32 are manufactured by insert-molding of resin such as epoxy resin, liquid crystal polymer or the like to a lead frame in a prescribed shape or by die-casting molding of metal such as aluminum, zinc or the like. In this case, in the first package 31 are formed a positioning face 210 for the first light-emitting element 21, a positioning face 220 for the second light-emitting element 22, positioning faces 230 for the prisms 23, 24, a positioning face 260 for the collimator lens 26, and a positioning face 270 for the sensor lens 27 by a vertical face, a horizontal face or an inclined face of the lead frame or the resin portion. Furthermore, a positioning face 280 for the total reflection mirror 28 for signal detection, and a positioning face 290 for the total reflection mirror 29 for monitor are formed as shown in FIG. 4, and a mounting part 710 for the first diffraction element 71 and a mounting part 720 for the second diffraction element 72 are formed in the first package 31, and thus the respective optical components are mounted at predetermined positions. The λ/4 plate 25, the λ/2 plate 79 and the prisms 23, 24 are joined together and integrated as a composite part and then mounted to the first package 31. Therefore, the positioning face 230 performs positioning of the entire composite part.

Next, after the light receiving element 91 for signal detection and the light receiving element 92 for monitor are mounted at predetermined positions on the wiring board 321 of the second package 32, the packages 31, 32 are joined together to manufacture the optical module 3. In this case, while the first light emitting element 21 fixed on the first package 31 is turned on and the return light beam which is reflected by a mirror member (not shown) provided the outside of the optical module 3 is received with the light receiving element 91 for signal detection, the position of the second package 32 is adjusted to determine the positional relationship between the first light emitting element 21 and the light receiving element 91 for signal detection. The first package 31 and the second package 32 are fixed in the state where the light receiving element 91 for signal detection is positioned. Next, while the second light emitting element 22 is turned on and the return light beam which is reflected by the mirror member of an optical system (not shown) provided the outside of the optical module 3 is received with the light receiving element 91 for signal detection, the position of the second light emitting element 22 is adjusted.

Further, with respect to the first and the second diffraction elements 71, 72, a relative positional relationship between the diffraction elements 71, 72 is adjusted. In other words, it is necessary to adjust the angular position of the first diffraction element 71 such that, in the state that the optical head device 1 has been finished to be manufactured, as shown in FIG. 7(A), the distances between the spot position B10 of the main beam and the spot positions B11, B12 of the sub-beam generated by the first diffraction grating 71 are adjusted, and the line L1 connecting the spot position B10 of the main beam with the spot positions B11, B12 of the sub-beams forms the angle θ1 with respect to the track tangential direction L10 of a disk of DVD system so as to correspond to the track pitch of the disk of DVD system. Further, as shown in FIG. 7(B), it is necessary to adjust the angular position of the second diffraction element 72 such that the distances between the spot position B20 of the main beam and the spot positions B21, B22 of the sub-beam generated by the second diffraction grating 72 are adjusted, and the line L2 connecting the spot position B20 of the main beam with the spot positions B21, B22 of the sub-beams forms the angle θ2 with respect to the track tangential direction L20 of a disk of CD system so as to correspond to the track pitch of the disk of CD system. For this reason, in the embodiment of the present invention, first, the first and the second diffraction elements 71, 72 are temporarily fixed by using the leaf springs 712, 722 in the mounting parts 710, 720 for the first and the second diffraction elements 71, 72 of the first package 31 at a step for manufacturing the optical package 3. After that, the first and the second diffraction elements 71, 72 are swung with the projections 713, 723 as the supporting point in the circumferential direction of the optical axis or the axial line parallel to the optical axis such that the line L1 connecting the spot position B10 of the main beam with the spot positions B11, B12 of the sub-beams generated by the first diffraction element 71 forms the angle Δθ(=θ2−θ1) with respect to the line L2 connecting the spot position B20 of the main beam with the spot positions B21, B22 of the sub-beams generated by the second diffraction grating 72. In other words, the angular positions of the first and the second diffraction elements 71, 72 are adjusted. After that the first and the second diffraction elements 71, 72 are adhesively fixed in the mounting parts 710, 720 for the first and the second diffraction elements.

The relative positional relationship of the first and the second diffraction elements 71, 72 is adjusted on the optical module 3 (on the first package 31) such that the first and the second light emitting elements 21, 22 are turned on and the first order diffracted lights generated by the first and the second diffraction elements 71, 72 are observed by using an image processing technique.

Alternatively, the relative positional relationship of the first and the second diffraction elements 71, 72 may be adjusted by optically observing the respective grating patterns.

As described above, after the positional adjustment of the first and the second diffraction elements 71, 72 has been performed at the stage of assembling the optical module 3, the optical module 3 is mounted on the device frame 4 to manufacture the optical head device 1. In this case, the optical module 3 is temporarily fixed on the device frame 4 with a jig, the first and the second light-emitting elements 21, 22 are turned on in this state, and the angular position and the like of the entire optical module 3 is adjusted while the return light beam from an optical recording disk is monitored with the light receiving element 91 for signal detection, and then the optical module 3 is adhesively fixed on the device frame 4.

In the embodiment of the present invention, it is preferable to form a projection on the optical module 3 side or the device frame 4 side, which serves as a supporting point for swinging the entire optical module 3 so as to be easily adjust the angular position of the optical module 3.

As described above, in the embodiment of the present invention, the two light emitting elements 21, 22, the two diffraction elements 71, 72 and the like are integrated together as the optical module 3 and, after the relative positional relationship of the two diffraction elements 71, 72 is adjusted on the optical module 3, the position of the entire optical module 3 is adjusted on the device frame 4. In other words, when the types of the optical recording disks to be used are determined, the track pitches are determined and thus the relative positional relationship of the diffraction elements 71, 72 is determined. Therefore, the relative positional relationship of the diffraction elements 71, 72 can be adjusted on the optical module 3. Consequently, since fine positional adjustments of the small diffraction elements are not required after the optical module is mounted on the device frame, the position adjusting operations for the main beam and the sub-beams with respect to the track can be easily performed.

Further, in the embodiment of the present invention, the positioning faces 711, 721 for the diffraction elements 71, 72 in the direction of the optical axis and the projections 713, 723 serving as the supporting point when the diffraction elements 71, 72 are swung about the optical axis or the axial line parallel to the optical axis are formed to the respective mounting parts 710, 720 for the two diffraction elements in the optical module 3. The relative positional relationship of the diffraction elements 71, 72 can be easily adjusted on the optical module 3. Moreover, since the leaf spring is used for temporarily fixing the diffraction elements 71, 72 in the mounting parts 710, 720 for diffraction element, the adjusting operations for the angular positions of the diffraction elements 71, 72 can be easily performed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A manufacturing method for an optical head device including a plurality of light sources emitting light beams with different wavelengths, a plurality of diffraction elements generating a main beam and sub-beams from the respective light beams emitted from the plurality of light sources, a common light receiving element receiving a reflected light beam from an optical recording medium, and a device frame on which the plurality of light sources, the plurality of diffraction elements, the light receiving element and an objective lens drive mechanism are mounted, comprising the steps of:

integrating at least the plurality of light sources and the plurality of diffraction elements with each other as an optical module;

adjusting a relative positional relationship between the plurality of diffraction elements with each other on the optical module;

then, adjusting spot positions of the sub-beams on the optical recording medium by adjusting the entire optical module on the device frame; and after that, fixing the optical module on the device frame.

2. The manufacturing method for an optical head device according to claim 1, wherein the adjustment of the relative positional relationship of the plurality of diffraction elements is performed by observing images of the diffracted sub-beams generated by the plurality of diffraction elements on the optical module.

3. The manufacturing method for an optical head device according to claim 1, wherein the adjustment of the relative positional relationship of the plurality of diffraction elements is performed by observing grating patterns formed on the plurality of diffraction elements.

4. The manufacturing method for an optical head device according to claim 1, further comprising the steps of:

providing in a mounting part for the diffraction element a positioning part for the diffraction element in a direction of an optical axis, a spring member urging the diffraction element against the positioning part for temporarily fixing the diffraction element, and a projection serving as a supporting point when the diffraction element is swung in a circumferential direction of the optical axis or an axial line parallel to the optical axis;

adjusting the relative positional relationship between the plurality of diffraction elements on the optical module; and then fixing the diffraction elements on the optical module.

5. An optical head device comprising:

a plurality of light sources emitting light beams with different wavelengths;

a plurality of diffraction elements generating a main beam and sub-beams from the respective light beams emitted from the plurality of light sources;

a common light receiving element receiving a reflected light beam from an optical recording medium; and a device frame on which the plurality of light sources, the plurality of diffraction elements, the light receiving element and an objective lens drive mechanism are mounted;

wherein at least the plurality of light sources and the plurality of diffraction elements are mounted on the device frame in a state that the plurality of light sources and the plurality of diffraction elements are integrated with each other as an optical module, and at least one of respective mounting parts of the optical module for the plurality of diffraction elements is provided with a positioning part for the diffraction element in a direction of an optical axis, a spring member urging the diffraction element against the positioning part for temporarily fixing the diffraction element, and a projection serving as a supporting point when the diffraction element is swung in a circumferential direction of the optical axis or an axial line parallel to the optical axis.

* * * * *